(12) United States Patent
Britto Mattos Lima et al.

(10) Patent No.: US 10,937,331 B2
(45) Date of Patent: *Mar. 2, 2021

(54) LEARNING SYSTEMS AND AUTOMATIC TRANSITIONING BETWEEN LEARNING SYSTEMS

(71) Applicant: International Business Machines Corporation, Armonk, NY (US)

(72) Inventors: Andrea Britto Mattos Lima, Sao Paulo (BR); Carlos H. Cardonha, Sao Paulo (BR); Rodrigo Laiola Guimaraes, Vitoria (BR); Vagner F. D. Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 530 days.

This patent is subject to a terminal disclaimer.

(21) Appl. No.: 15/817,496

(22) Filed: Nov. 20, 2017

(65) Prior Publication Data

US 2018/0286266 A1 Oct. 4, 2018

Related U.S. Application Data

(63) Continuation of application No. 15/475,248, filed on Mar. 31, 2017, now Pat. No. 10,573,194.

(51) Int. Cl.
*G09B 7/07* (2006.01)
*G09B 5/02* (2006.01)
*G09B 7/08* (2006.01)

(52) U.S. Cl.
CPC .............. *G09B 7/07* (2013.01); *G09B 5/02* (2013.01); *G09B 7/08* (2013.01)

(58) Field of Classification Search
CPC .............. G09B 5/00; G09B 7/00; G09B 7/07
See application file for complete search history.

(56) References Cited

U.S. PATENT DOCUMENTS

| | | |
|---|---|---|
| 5,002,491 A | 3/1991 | Abrahamson et al. |
| 6,160,987 A | 12/2000 | Ho et al. |
| 6,302,698 B1 | 10/2001 | Ziv-El |
| 6,341,960 B1 | 1/2002 | Frasson et al. |
| 6,370,355 B1 | 4/2002 | Ceretta et al. |

(Continued)

FOREIGN PATENT DOCUMENTS

| | | |
|---|---|---|
| CA | 2632907 A1 | 4/2007 |
| WO | 2007117456 A2 | 10/2007 |

OTHER PUBLICATIONS

List of IBM Patents or Patent Applications Treated as Related, dated Nov. 20, 2017, 2 pages.

(Continued)

*Primary Examiner* — Peter R Egloff
(74) *Attorney, Agent, or Firm* — Scully, Scott, Murphy & Presser, P.C.; Joseph Petrokaitis

(57) ABSTRACT

An online learning system selects content for a learning session and opens a user interface to start the learning session on a plurality of devices. A mode of instruction is selected for the learning session. An activity to perform associated with the content is presented. Performance of the activity is monitored and a performance metric and/or a heterogeneity metric associated with a key performance indicator for the activity performed is generated. Responsive to determining that the performance metric and/or a heterogeneity metric is outside of the target range, the mode of instruction may be switched automatically.

7 Claims, 6 Drawing Sheets

(56) References Cited

U.S. PATENT DOCUMENTS

| | | |
|---|---|---|
| 6,652,283 B1 | 11/2003 | Van Schaack et al. |
| 6,767,211 B2 | 7/2004 | Hall et al. |
| 7,840,175 B2 | 11/2010 | Hochwarth et al. |
| 8,571,462 B2 | 10/2013 | Hochwarth et al. |
| 2004/0133437 A1 | 7/2004 | Draper, Jr. et al. |
| 2005/0221264 A1 | 10/2005 | Hearn et al. |
| 2007/0099165 A1 | 5/2007 | Moesges et al. |
| 2010/0268686 A1 | 10/2010 | Germany |
| 2012/0122061 A1 | 5/2012 | Dohring et al. |
| 2013/0004929 A1 | 1/2013 | Otwell |
| 2016/0063881 A1 | 3/2016 | Brinton et al. |

OTHER PUBLICATIONS

Office Action dated Jan. 11, 2019 received in parent U.S. Appl. No. 15/475,248, 19 pages.
Office Action dated Jul. 12, 2019 received in parent U.S. Appl. No. 15/475,248, 9 pages.

LEARNING SYSTEMS AND AUTOMATIC TRANSITIONING BETWEEN LEARNING SYSTEMS

CROSS-REFERENCE TO RELATED APPLICATIONS

This application is a continuation of U.S. patent application Ser. No. 15/475,248 filed Mar. 31, 2017 which is incorporated by reference herein in its entirety.

FIELD

The present application relates generally to computers and computer applications, and more particularly to learning systems.

BACKGROUND

Computer-based training (CBT) often implies self-paced instruction available anywhere and anytime at the convenience of the learner; however, CBT methods can complement and provide many advantages even to conventional methods of classroom instruction at a centralized location, in which the students and instructor must meet physically in the same location at the same time. On the one hand, self-paced technology-based instruction is one-to-one, so that every student can receive material tailored to individual needs and proceed at his or her own pace. However, this method can also be highly disadvantageous if the goal of the learning activity includes the maximization of utilization of the group as a whole (and not of a particular individual). On the other hand, in instruction-led technology-based instruction methods the instructor controls the speed of the class and manages the group proficiency level, but it is often the case in which he or she bypasses slow learners or bore fast ones, mainly due to the lack of real-time feedback describing the performance of the students. As a result, many students may feel overwhelmed whereas some may receive training they do not need.

BRIEF SUMMARY

A system and method of online learning may be presented. The system, one aspect, may include at least one hardware processor and a storage device coupled to the hardware processor. The hardware processor may select content for a learning session and open a user interface to start the learning session on a plurality of devices. The hardware processor may select a mode of instruction for the learning session. The mode of instruction may include self-paced learning or mediated learning. The hardware processor may present via the user interface an activity to perform associated with the content during the learning session. The hardware processor may retrieve from the storage device a key performance indicator associated with the activity, a target range associated with the key performance indicator, and a heterogeneity threshold associated with the activity. The hardware processor may monitor performance of the activity, and generate a performance metric associated with the key performance indicator for the activity performed on each of the plurality of devices based on the monitoring. Responsive to determining that the performance metric is outside of the target range, the hardware processor may automatically switch the mode of instruction to a different mode of instruction, and present on the user interface, the activity to be performed in the different mode of instruction.

A method of online learning, in one aspect, may include selecting content for a learning session and opening a user interface to start the learning session on a plurality of devices. The method may also include selecting a mode of instruction for the learning session, wherein the mode of instruction may include self-paced learning or mediated learning. The method may further include presenting via the user interface an activity to perform associated with the content during the learning session. The method may also include retrieving from a storage device a key performance indicator associated with the activity, a target range associated with the key performance indicator, and a heterogeneity threshold associated with the activity. The method may also include monitoring performance of the activity, and generating a performance metric associated with the key performance indicator for the activity performed on each of the plurality of devices based on the monitoring. The method may further include, responsive to determining that the performance metric is outside of the target range, automatically switching the mode of instruction to a different mode of instruction, and presenting on the user interface, the activity to be performed in the different mode of instruction.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
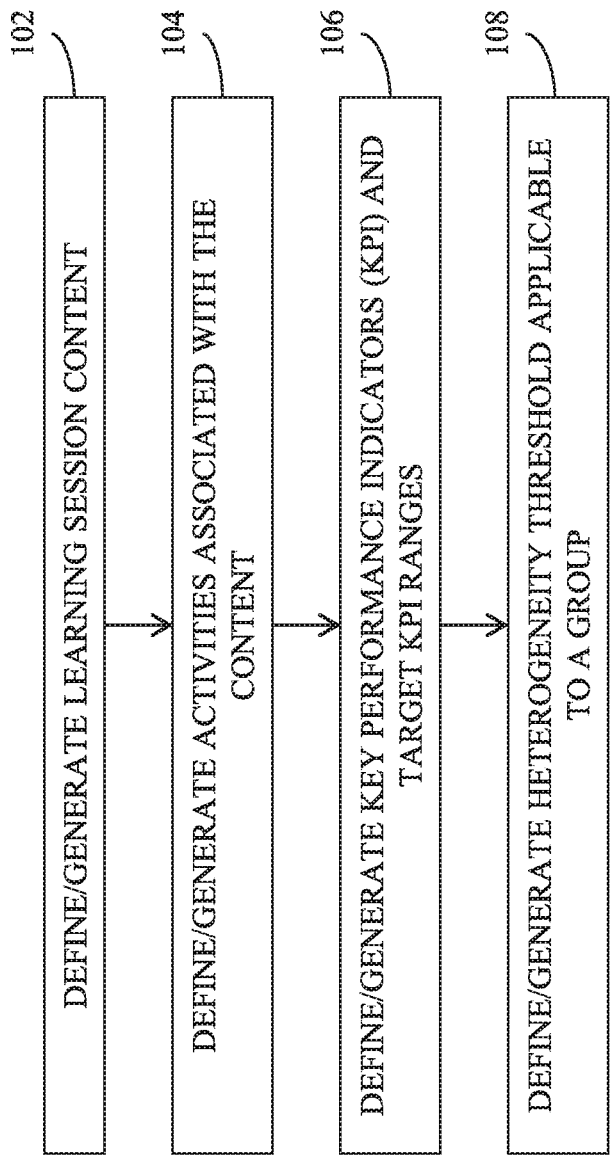
FIG. 1 is a flow diagram illustrating defining of various parameters for online learning in one embodiment of the present disclosure.

A method and a system may be provided for a learning system to recommend when the instruction modes should be switched between self-paced learning and instruction-led technology-based learning to maximize the efficiency (e.g., time spent to learn a certain concept, success rate on evaluation steps) of a group of students during a learning session. The learning system of the present disclosure in one embodiment may orchestrate a learning session, for example, by controlling different modes of operation such as self-paced learning (asynchronous learning) and mediated learning (synchronous learning). The system in one embodiment may monitor online learning sessions, assess in real-time the performance of learners in a group, and autonomously indicate an execution mode that optimizes the learning of the learners in the group.

In one embodiment, the method and system are capable of recommending in real-time a learning method to employ during a point in a learning session in order to maximize the efficiency of the group's learning. The learning system of the present disclosure in one embodiment may start learning session with all students or learner in a self-paced learning. For example, an individual learning session (e.g., a web site's browser page or a learning application) may be opened for each learner and each learner allowed to independently execute through the learning session at the learner's own pace. The learning system may capture key performance indicators (KPIs) of individuals. Examples of KPIs may include but are not limited to, execution time in each step, skill level, scores on quizzes. Responsive to determining that one or more of those performance metrics (KPIs) one or more individuals taking part of the learning session falls under the expected thresholds, a notification is generated. The notification may include a signal to an instructor indicating potential difficulty a student (learner) or a subgroup of students has in the self-paced method. This may occur, for example, if a student is spending relatively more time than expected in a topic or making many mistakes on evaluation steps. The notification may include a recommendation to switch to technology-mediated instruction mode. In one embodiment, the notification may include a signal to a system of the present disclosure to automatically switch the learning mode of the students to the technology-mediated instruction mode. The technology-mediate instruction mode, for example, is instruction-led. In the instructor-led technology-mediated instruction, once the efficiency of the student or the subgroup that was below the threshold catches up, i.e., exceeds the threshold our boundary of the target metrics (e.g., success rate of students exceeds the minimum threshold level), the learning system of the present disclosure generates a notification signaling that the learning session can be switched back to that of the self-paced mode. In one embodiment, the notification may include a signal to a system of the present disclosure to automatically switch the learning mode back to the self-paced mode.

Repository of educational material stores a collection of learning objects for one or more learning activities. Learning objects may include content and assessment items.

A database of metadata store metadata associated to each individual learning object. Examples of metadata may include, but are not limited to: data describing the difficulty level, expected completion time, prerequisites, acquired competencies or skill points, target learning style. Metadata may be added by the author of the learning objects, automatically derived from historical data. For example, average completion time of the learning content or material may be computed based on past completion time of students who have successfully learned based on the learning content.

A database of students' profile stores students' profile (or clusterization) containing information about preferred learning styles, current knowledge levels or skill points, strengths, weaknesses of a respective learner.

A learning plan in one embodiment contains a collection of concepts and exercises (e.g., in the form of digital learning objects) to be taught in a learning session. The instructor can create such plan either manually or with support of an automatic method and system.

Each student or learner has a device (e.g., smart phone, tablet or PC) to interact with the learning objects of a given learning session. Before learning session starts, the system receives target learning plan, students' profiles (e.g., current knowledge level), and information describing the desired threshold levels for performance indicators (e.g., execution time in each step, performance in evaluations).

FIG. 1 is a flow diagram illustrating defining of various parameters for online learning in one embodiment of the present disclosure. One or more hardware processors may perform the method. At 102, content to be presented in a learning session may be defined and/or generated. The content, for example, may be received from a storage device storing learning session content. For instance, the content may be defined before the learning session by an instructor or a teaching institution. A content is any topic that the students should learn in a specific course, for example, in a Geometry course, each learning session may focus on topics such as surfaces, points, curves, distances.

At 104, activities associated with the content may be defined or generated. Examples of activities may include, but are not limited to, definition of terms, text material, multimedia content, quizzes, questionnaires, and tests. The activities provide learning environment for learning the content during the online learning session. Briefly, the content refers to the material received by the student; the activity refers to the task for the student to practice how well he understood the material, for example, which is monitored by the system automatically to access the performance of the students.

At 106, key performance indicators (KPI) and target KPI ranges associated respectively with those key performance indicators may be defined. KPIs are indicators or measures that allow identifying those learners who are excelling or not doing well on the content or topic, during an online learning session. Examples of KPIs may include, but are not limited to, error rate, time to perform a given task, and accuracy rate. Target KPI ranges can be defined that provide criteria or threshold of determining whether a learner (student) is doing well or not. In one embodiment of the present disclosure, a KPI range can be defined based on the historical data, considering the higher range value as the mean plus standard deviation of the said KPI and the lower value as the mean minus the standard deviation of the said KPI.

At 108, a heterogeneity threshold applicable to a group of learners (e.g., a class) may be defined, for example, based on the KPIs. For example, the heterogeneity threshold may be pre-set by an instructor or teaching institution and defines the minimum KPI value acceptable for a student in a given content (different contents may have different thresholds). In another embodiment, the threshold may be determined based on historical data, for example, defined minimum test grades or KPI values associated with a student at the time the students ask the instructor for clarification on a given subject. The defined or generated information at 102, 104, 106 and 108 are stored in a database or the like, in a storage device.

Figure 2:
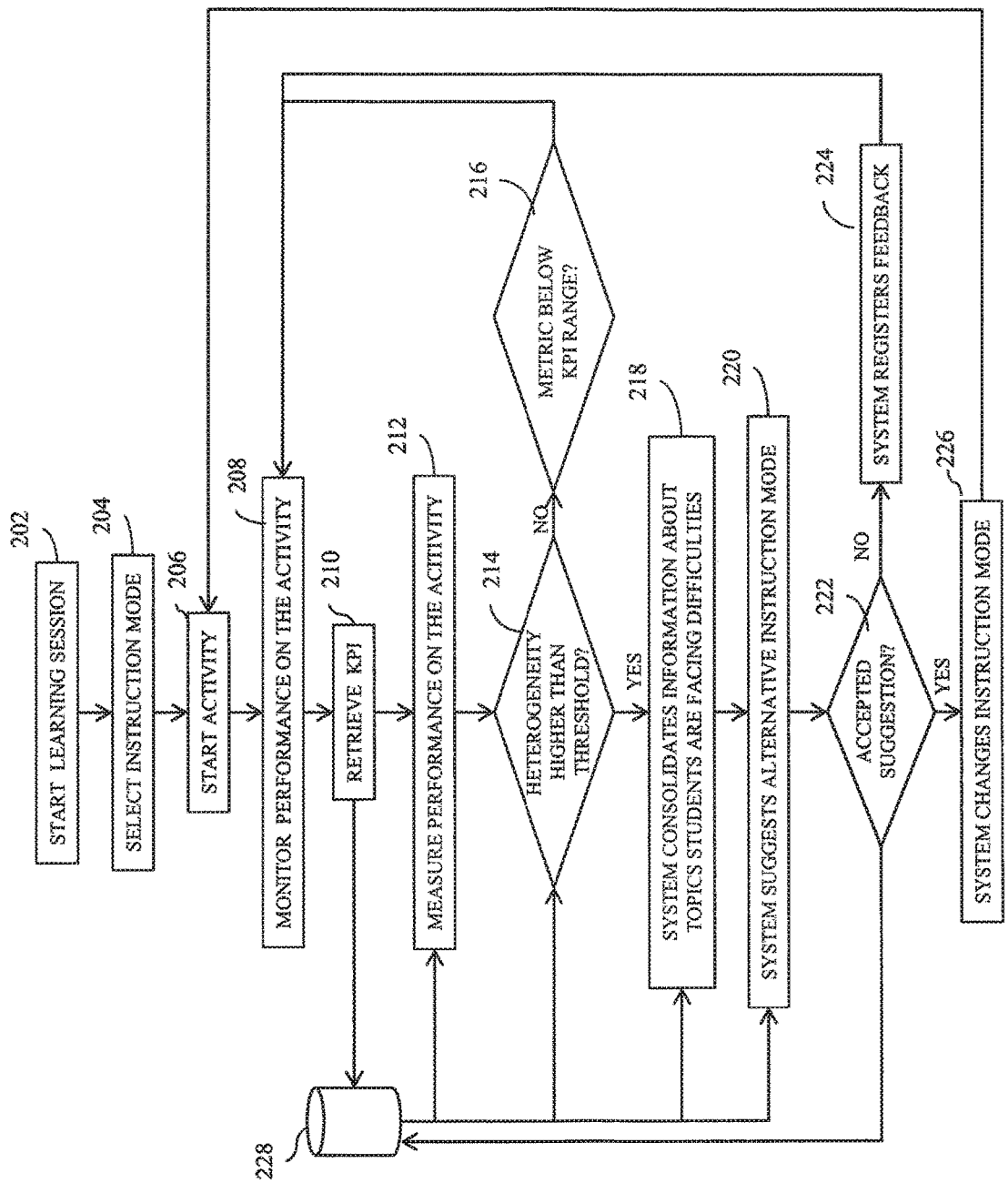
FIG. 2 is a flow diagram illustrating a method of the present disclosure in one embodiment.

FIG. 2 is a flow diagram illustrating a method of the present disclosure in one embodiment. One or more hardware processors, e.g., executing an online learning system (or module), may perform the method. At 202, a learning session is started. For instance, content may be selected for the learning session and a user interface or a browser window is opened on a plurality of devices. Users on the plurality of devices make up a class or a group for the learning session.

At 204, an instruction method may be selected. For instance, a mode of instruction for the learning session is selected, for example, from a self-paced learning mode and a mediated learning mode. In self-paced learning mode, a user on a device (e.g., of the plurality of devices) runs through the content for learning during the learning session on user's own pace, asynchronously from other devices (e.g., of the plurality of devices). In mediated learning mode, the pace of learning is synchronous among the plurality of devices. For example, the plurality of devices run through the content of the learning session at the same pace as the learning in that mode is synchronized. In one embodiment, the instruction mode selected automatically by a hardware processor running the learning session, for example, based on historical data associated with the learning capabilities of the group that is making up the class, for example, student information that may include the knowledge level and speed or rate of learning associated with the students in the group, learning plan. The learning session may be started in the mediated mode (e.g., assuming that, for the current content, the KPI level of the classroom is zero). In another embodiment, the system may use historical data (from the current classroom or from other classrooms that had previously received the same content) to start the learning session on a different mode.

In one aspect, the online learning session (e.g., executing on a hardware processor) may send a notification to a user such as an instructor that is leading the online session, for example, via a user interface of the learning session that is running on that user's device, the selected mode, and the user may be given an option to accept or override (e.g., select another instruction mode) to start the learning session.

At 206, one or more activities associated with the learning content are started on the online learning session. For example, one or more activities to perform are presented via the user interface running on the plurality of devices.

At 208, students perform the one or more activities presented in the online session, and the performing of, e.g., interacting with, those one or more activities are monitored.

At 210, one or more KPIs associated with the one or more activities, a target range associated with the key performance indicator, and heterogeneity threshold associated with the one or more activities are retrieved, for example, from a storage device 228 that stores the information. In one embodiment, this module 228 stores: the algorithm for computing the performance of the students during the activity based on the collected KPIs (212), the heterogeneity threshold that is pre-defined, for example, before the learning session (214), the algorithm for computing the topics in which the students are not performing well (218), and the mapping of the most adequate instruction mode according to the current performance (220). The system provides a suggestion based on this data, and in one embodiment, the instructor may be provided with an option to accept or not accept the suggestion. The system stores in the same module 228 the information whether the user accepted the suggestion (222), for example, which the system may use to refine the algorithms.

At 212, based on the monitoring of the performing of the activities, a performance metric respect to the one or more KPIs is determined, for example, for the activity performed during the learning session. A performance metric is determined for an activity performed during a learning session on a device, for example, associated with a student or learner. Each of the plurality of devices (running a learning session activity) generally might not have the same performance metric, as one student's pace of learning may be different from another student's pace of learning. For instance, the monitoring may include determining the amount of time a user spends on an activity, for instance, computes the time the activity is presented on the user interface until a next activity is presented on the user interface, or for example, until a user input is received on the user interface. Since the tests are executed in a computer device, the system may check how long each student took to complete the test. For example, if each test is loaded on a different screen, the system stores the timestamp of when the student first loaded the screen, and the timestamp of when the student left or closed the screen. Also, the system stores the ground truth (previously defined) for all tests, and can check whether the students had inputted the same answer from the ground truth. In this way, the online learning system of the present disclosure may identify which student is doing well or not well on which activities or topics.

At 214, the online learning system determines whether the performance metrics computed for all students in the group exceed the heterogeneity threshold. For example, based on the KPI, the system computes a performance metric (which is a numerical value) for each student. The system analyzes whether these values are similar for all students, by computing, for example, the standard deviation, which produces another numerical value—this second value is then compared with the heterogeneity threshold (previously stored) in order to estimate whether the students are performing similarly, for example, within the standard deviation.

If the heterogeneity threshold is not exceeded, at 216, the online learning system determines whether one of the student's performance metric is below the KPI range. If it is determined that the students are performing similarly (e.g., as determined at 214), there may be two possible scenarios: (1) all students are performing well enough or (2) all students are not performing well enough on the topic.

If it is determined that the heterogeneity threshold is not exceeded at 214 and that a student's performance metric is not below the KPI range at 216, the logic of the method proceeds to 208, and the online learning system continues to monitor performance of one or more activities in the learning session.

If at 214, the online learning system determines that the performance metrics computed for all students in the group does not exceed the heterogeneity threshold, or at 216, the online learning system determines that a student's performance metric is not below the KPI range, the logic of the method proceeds to 218.

At 218, the online learning system consolidates information associated with one or more topics in which the student or students are facing difficulties. For example, a learning session may be composed of a group of topics. The learning system may evaluate the performance of the students on each of the topics, and for example, determine or infer which students are not meeting a performance threshold.

At 220, the online learning system determines an alternative instruction mode that would help in allowing the student or students facing difficulties to be able to more easily comprehend the topic of difficulty. For example, if all students are performing unsatisfactorily, the system may suggest and the instructor may use the mediated mode to provide more detailed explanations on the problematic topics determined by the online learning system.

Learning modes that are suggested may include self-paced, mediated, group activity, and pair activity. For instance, if the current mode of instructions is mediated learning, then the alternative instruction mode may be one of self-paced learning, group activity learning, and pair activity learning. As another example, if the current mode of instructions is self-paced learning, the alternative instruction mode may be one of mediated learning, group activity learning, and pair activity learning.

At 222, the online learning system notifies a user (e.g., user's device that a user leading the online learning session is using), for example, an instructor, that the instruction mode should be switched. In one aspect, the system provides an option to the instructor to not accept the suggestion to switch the mode, for example, via a user interface on the user's device. For example, at 224, responsive to the instructor overriding the suggestion or not accepting the suggestion, the online learning system registers (or stores) the information that the suggest was not accepted and returns to the monitoring of activity performance at 208.

At 226, responsive to the instructor accepting the suggestion, the online learning system switches the learning mode to the suggested mode (alternative instruction mode). In one embodiment, the online learning system may automatically or autonomously switch the instruction mode, for example, without an input from the instructor. The logic of the method proceeds to 206, where an activity is presented based on the switched instruction mode.

In one embodiment, independently from the chosen strategy, the online learning system may monitor and collect information about target parameters in real-time (e.g., execution time per step, performance on evaluation steps). On self-paced mode, whenever the performance metric of a particular individual or a subgroup degrades and falls under the expected threshold, an instructor or the like may be notified about potential difficulties the students are facing (e.g., spending considerably more time than expected in a topic or making many mistakes on evaluation steps). On instructor-led mode, whenever the performance metric of the group exceeds a threshold, the instructor is notified about the familiarity of students with the topic (e.g., making few or no mistakes on evaluation steps). If the conditions continue to hold (eventually, efficiency getting better) during a period of time, the online learning system recommends shift of instruction method, and may automatically switch to a different learning mode.

In one embodiment, group activities may take into account additional constraints such as exploring preferred configurations and affinity levels among students. Other learning modes may also be considered: for example, best students may be selected for monitoring activities and presenting seminars. Machine learning components may identify thresholds used to indicate when learning modes should be executed. This can be performed either automatically (fully based on learning data) or using the human in the loop (e.g., teacher provides a feedback on the performance of the system).

For example, preferred arrangements and affinity levels may be assigned to positive scores; that is, whenever two students are put in the same group, a bonus value proportional to this score is assigned to the final solution. By exploring this aspect, an algorithm computing the groups may select arrangements with high scores. The selection of students for monitoring activities and seminars may follow decision-based rule schemes. For instance, a student may only be selected if the student reached the desired knowledge levels earlier than her colleagues. An embodiment of a machine learning algorithm used to define threshold values is as follows. For each possible threshold value, the learning system may collect the average rate of student improvement per time period (e.g., hour, for example, average number of topics mastered per student and per hour) after the transition (and before the next transition); this information is extracted from historic data. Based on the results, the learning system selects the threshold value delivering the highest expected improvement. If enough data is available, this approach can be extended to take into account different classes of topics or student profiles.

Figure 3:
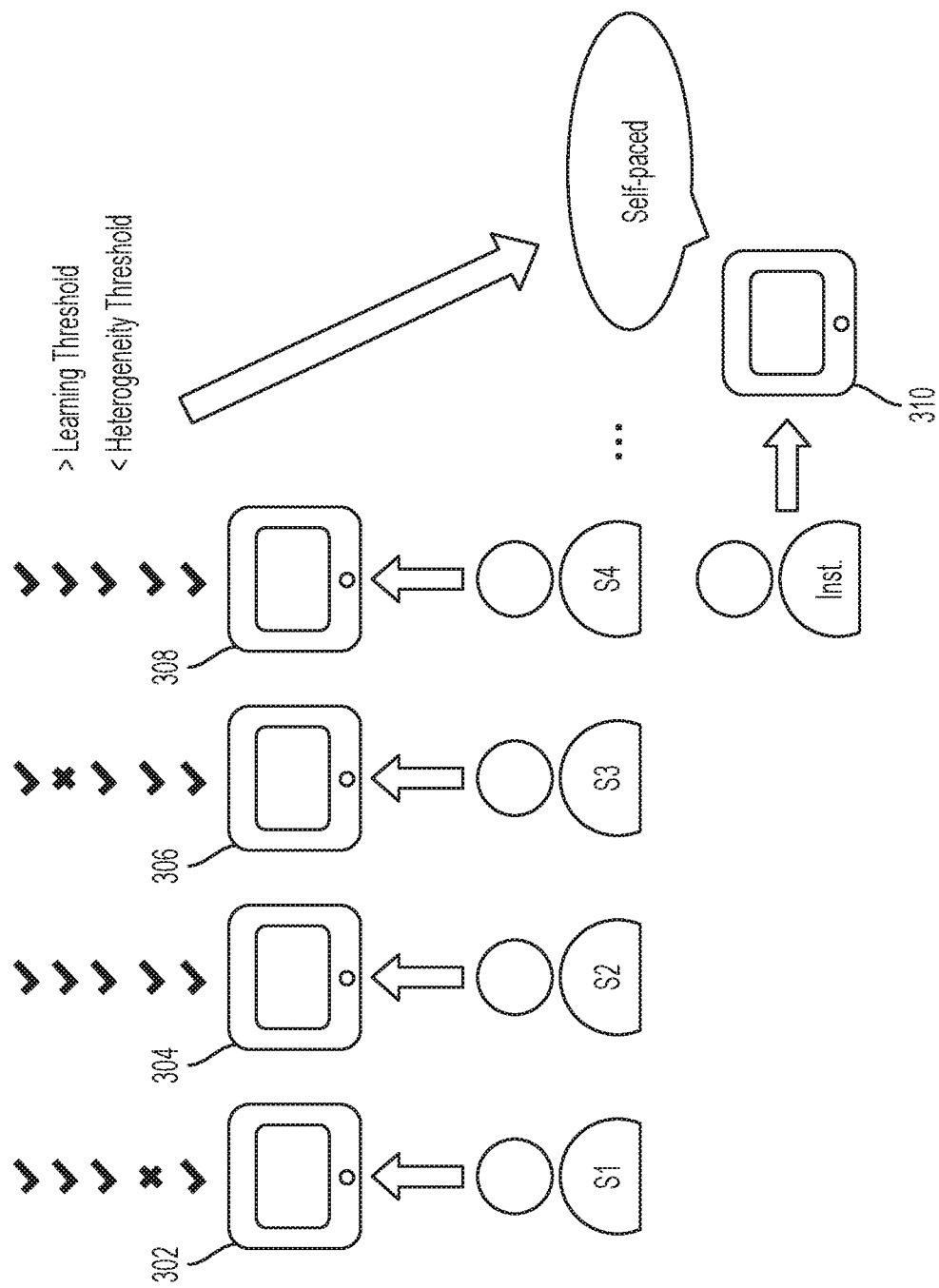
FIGS. 3-5 illustrate examples of learning sessions performed by users via their devices in one embodiment of the present disclosure.
Figure 4:
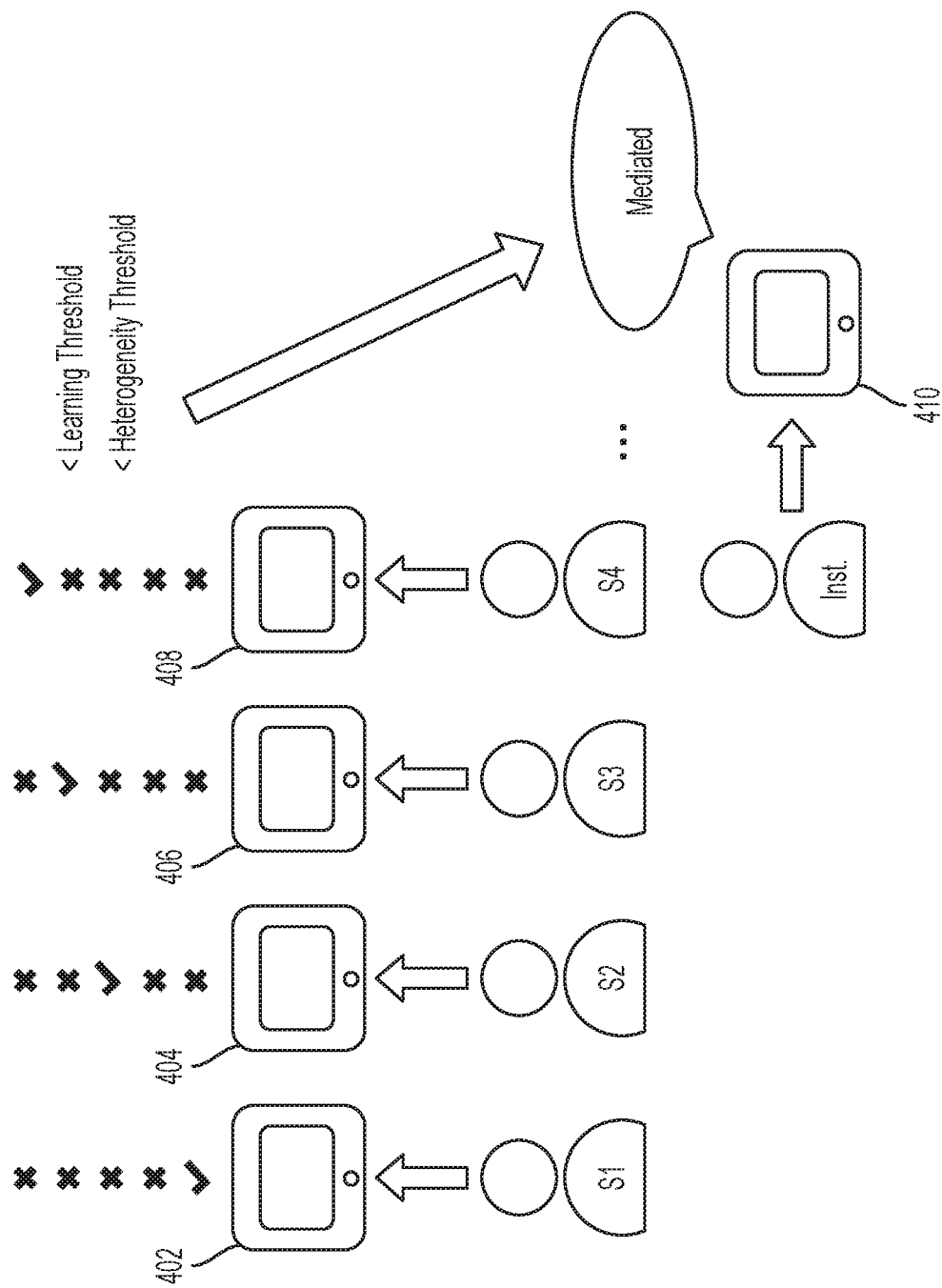
Figure 5:
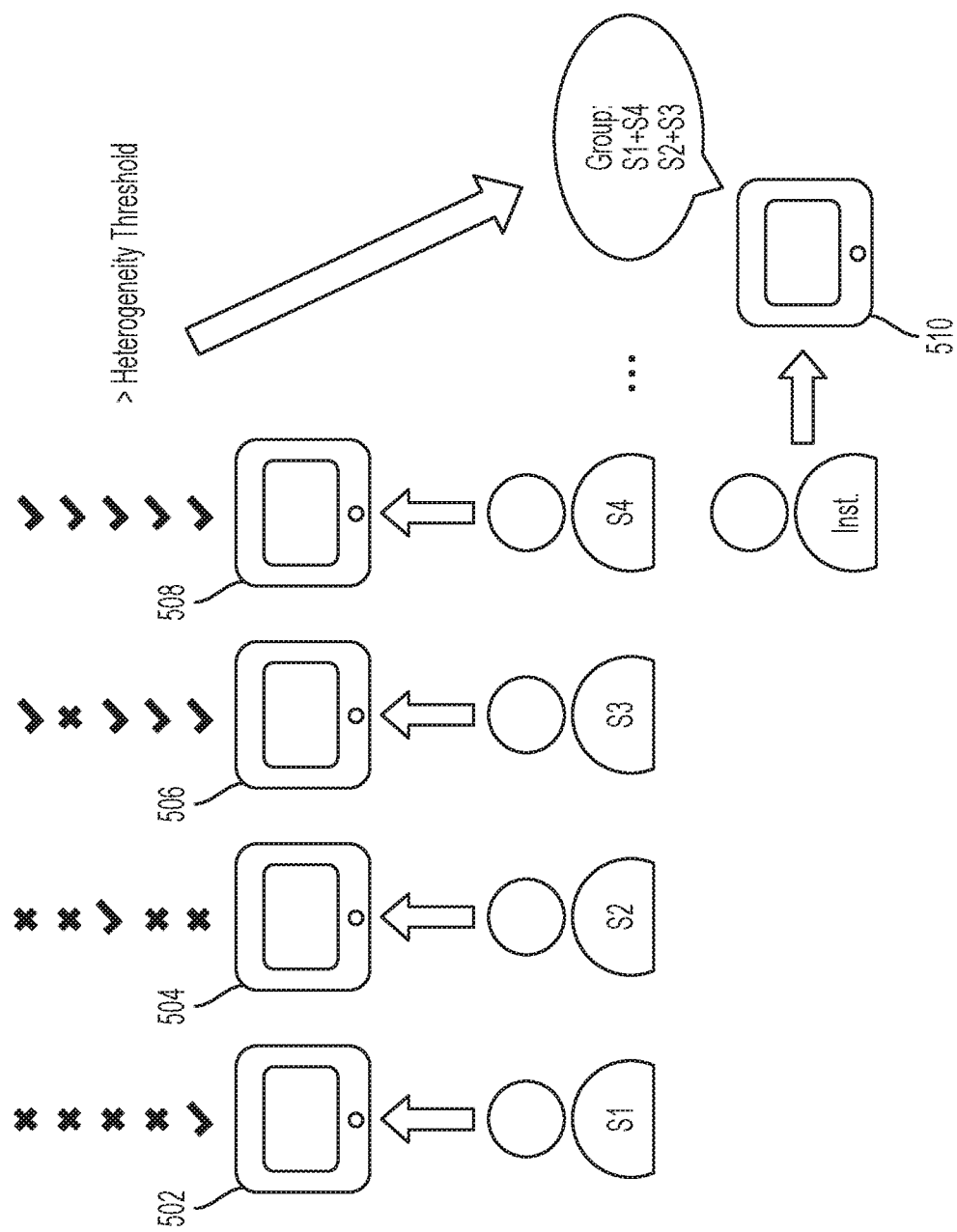

FIGS. 3-5 illustrate examples of learning sessions performed by users via their devices in one embodiment of the present disclosure. Referring to FIG. 3, the figure shows four student devices 302, 304, 306, 308 and an instructor's device 3410. An online learning system of the present disclosure in one embodiment orchestrates an online learning session. For example, a user such as an instructor may log into the online learning system as an instructor via that user's device, also referred to as an instructor's device 310. A learner or student may log into the online learning system as student on a device (e.g., 302, 304, 306, 308). The instructor via the instructor's device 310 may orchestrate a learning session. Consider that the online learning session selects self-paced mode to start. The online learning system monitors each of the students' interactions with the activities presented on user interfaces of the devices (302, 304, 306, 308) and determines performance metrics or measurements associated with each student in perform a given activity. The example in FIG. 3 shows five activities that are monitored that are performed by each student. The monitoring indicates that the students as a group are overall doing well (only student at 402 and 406 have not met an individual learning threshold as shown by 'x'; all others have done well as shown by a check mark). Moreover, in the example shown, heterogeneity threshold is not exceeded. Therefore, the online learning system recommends and/or automatically switches a mode of instruction to a self-paced mode. In one embodiment, two thresholds may be employed: (1) a learning threshold (which is same for all students), for checking weather students are performing satisfactorily; and (2) a heterogeneity threshold (which is same for all students), for checking whether one or more students are performing better than others.

Referring to FIG. 4, the figure shows four student devices 402, 404, 406, 408 and an instructor's device 410. Consider that an online learning session is conducted in self-paced mode, for example, following the example shown in FIG. 3. The online learning system continues to monitor each of the students' interactions with the activities presented on user interfaces of the devices (402, 404, 406. 408) and determines performance metrics or measurements associated with each student in perform a given activity. The example in FIG. 4 shows five activities that are monitored. The monitoring indicates that the students as a group overall are not doing well (each student at 402, 404, 406, 408) met an individual learning threshold or criteria with respect to only one activity as shown by one check mark; all other activities are illustrated with 'x' marks. Given that a high number of performance metrics has not met the learning threshold, heterogeneity threshold is also not met. Therefore, the online learning system here recommends and/or automatically switches the mode of instruction to mediated, in which the student can learn together synchronously with the instructor, with the instructor guiding the activities on the instructor's device 410 in sync.

Referring to FIG. 5, the figure shows four student devices 502, 504, 506, 508 and an instructor's device 510. The online learning system monitor each of the students' interactions with the activities presented on user interfaces of the devices (502, 504, 506. 508) and determines performance metrics or measurements associated with each student in perform a given activity. The example in FIG. 5 shows five activities that are monitored. The monitoring indicates that the students at 502 and 504 are not doing well with the five activities while the students at 506 and 508 are doing well. The online system determines that the performances exceed the heterogeneity threshold. The online system recommends and/or automatically switches the mode of instruction to a group activity mode. For example, group activity may be a preferred mode when the heterogeneity is high: the students with better performance may help the students with worse performance. The instructor via the instructor device 510 may start group sessions. For example, group sessions may be triggered whenever the heterogeneity level becomes too large (based on comparing to a threshold value that is predefined). An example criterion for grouping is coverage; for example, having groups containing students who, together, have sufficient knowledge level of most (if not all, for example 90% or another defined ratio or percentage) topics. In this particular example, s1 and s4 may be put in a group (they know different things), but all students may be grouped together since as they together would know more. The number of groups can be a pre-defined parameter of the problem, as well as the maximum number of students per group. The grouping problem may employ the set covering problem, a classical combinatorial optimization problem for which several approximated and exact solution approaches are known.

Figure 6:
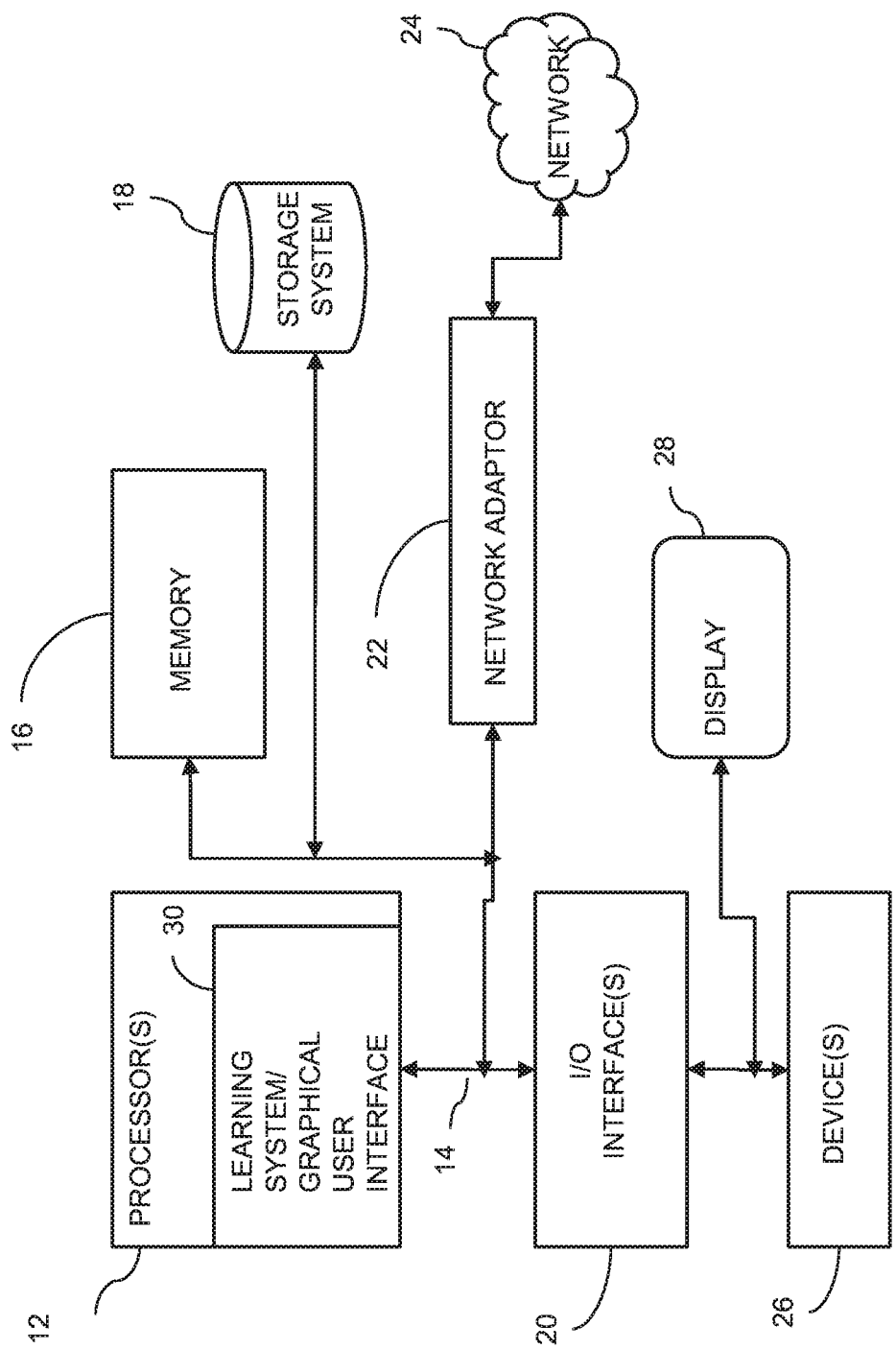
FIG. 6 illustrates a schematic of an example computer or processing system that may implement a learning system in one embodiment of the present disclosure.

FIG. 6 illustrates a schematic of an example computer or processing system that may implement a learning system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of online learning, the method executed by at least one hardware processor, the method comprising:

selecting content for a learning session for performing on a plurality of devices;

selecting a self-paced mode of instruction for the learning session;

selecting an activity to perform associated with the content during the learning session;

retrieving from a storage device a key performance indicator associated with the activity, a target range associated with the key performance indicator, and a heterogeneity threshold associated with the activity;

monitoring performance of the activity, and generating a performance metric associated with the key performance indicator for the activity performed on each of the plurality of devices based on the monitoring;

determining a deviation among all of the performance metric associated with the key performance indicator for the activity performed on each of the plurality of devices; and responsive to determining that the performance metric is outside of the target range and that the deviation exceeds the heterogeneity threshold, automatically switching the mode of instruction to a different mode of instruction, wherein the different mode of instruction comprises mediated learning, wherein switching to the mediated learning causes the plurality of devices to run through the content of the learning session at the same pace in a synchronized manner.

2. The method of claim 1, wherein the activity comprises at least one of definition of terms, text material, multi-media content, quiz, questionnaire and test.

3. The method of claim 1, wherein responsive to determining that the performance metric is outside of the target range, sending a notification signal to a device of a user that is leading the online learning session.

4. The method of claim 1, wherein the key performance indicator comprises of time to perform the activity.

5. The method of claim 1, wherein the monitoring comprises determining an amount of time the activity is presented on a user interface until a next activity is presented on the user interface.

6. The method of claim 1, wherein the key performance indicator comprises error rate in performing the activity.

7. The method of claim 1, wherein the key performance indicator comprises accuracy rate in performing the activity.

* * * * *